United States Patent [19]

Ellenby et al.

[11] Patent Number: 5,625,765
[45] Date of Patent: Apr. 29, 1997

[54] VISION SYSTEMS INCLUDING DEVICES AND METHODS FOR COMBINING IMAGES FOR EXTENDED MAGNIFICATION SCHEMES

[75] Inventors: John Ellenby; Thomas Ellenby; Peter Ellenby, all of La Jolla, Calif.

[73] Assignee: Criticom Corp., San Francisco, Calif.

[21] Appl. No.: 335,940

[22] Filed: Nov. 8, 1994

Related U.S. Application Data

[63] Continuation-in-part of Ser. No. 116,360, Sep. 3, 1993, Pat. No. 5,444,678.
[51] Int. Cl.$^6$ ................................................. G06T 3/00
[52] U.S. Cl. ................................................. 395/135; 395/139
[58] Field of Search ........................... 395/133, 135, 395/139, 118, 119, 123, 128–132; 364/413.13, 443

[56] References Cited

U.S. PATENT DOCUMENTS

| | | |
|---|---|---|
| 4,939,661 | 7/1990 | Barker et al. .................... 364/443 |
| 4,947,323 | 8/1990 | Smith .................... 364/413.13 |
| 4,970,666 | 11/1990 | Welsh et al. .................... 395/123 |

*Primary Examiner*—Almis R. Jankus
*Attorney, Agent, or Firm*—Page Lohr Associates

[57] ABSTRACT

Vision systems having knowledge of position and attitude can reliably determine what scenes are being addressed by the system. Real images of the scene can then be augmented with computer generated information which relates to the known scene. Since the level of detail or resolution is not restricted in computer generated models, a system can continue to provide further magnified images without limit. As magnification increases, the amount of information presented to a user from images of the real scene decreases but computer generated imagery continues to provides realistic images which represent scenes being addressed by the apparatus. Computer generated imagery is combined with an image of a real scene to form an augmented image which is presented to the user aligned to the viewing direction of the device at any desired magnification.

16 Claims, 21 Drawing Sheets

VISION SYSTEMS INCLUDING DEVICES AND METHODS FOR COMBINING IMAGES FOR EXTENDED MAGNIFICATION SCHEMES

BACKGROUND

This application is a continuation-in-part application from the earlier filed application having a Ser. No. of 08/116,360 filed on Sep. 3, 1993.

The field of the invention is related generally to vision imaging systems and particularly to the dynamic magnification of such vision systems. Readers are directed to inventors' previous patent application identified above which discloses in detail a vision imaging system having knowledge of its position and attitude and having a displayed image partially derived from that knowledge. The above-identified disclosure is important to the present invention and it is assumed that the reader is completely familiar therewith. That application is hereby incorporated by reference into this disclosure.

Imaging systems are known to employ variable magnification schemes. For optical imaging systems, a variable magnification lens can be used. Commonly referred to as a "zoom lens" or more simply "a zoom", the arrangement allows a user to adjust the magnification of a scene being addressed by the imaging device. Photographic cameras, video camcorders, binoculars, microscopes, et cetera, all employ zoom lenses for variable magnification. Because of certain mechanical properties such as weight and size, there are practical limits to the magnification ranges possible. Typical zoom lenses may have a focal length range between 35 mm and 500 mm. Lenses having longer focal lengths (and corresponding higher magnification) than 500 mm become too cumbersome for practical use in some devices. The magnification range of conventional imaging systems are therefore usually limited by the mechanical properties of optical lenses.

After an image is acquired by an optical system, for example after exposure of the film in a photographic camera or after a frame is captured in an electronic video camera, the image can be further manipulated to increase its size before final presentation. In a photographic system the image on the film's emulsion can enlarged for final presentation as a photographic print. In a video system, the image plane of the electronic camera is expanded to fit a motor usually larger than the image plane. While producing a larger image, this "second stage" magnification is subject to resolution problems. If the resolution unit of the optical image plane is expanded beyond the resolution unit of the intended display arrangement, image artifacts become apparent. This embodies itself as "graininess" in photographs and a "pixelized" appearance in video images.

A detailed explanation of "pixel expansion" techniques in the electronic domain is presented here to illustrate this further. Since electronic imagers convert an optical image into an electronic form, image magnification past the limits of the optical lens can be simulated. If each pixel of an optical image plane, the focal plane of a lens, is expanded to represent a larger area in displayed image plane, a final image can be presented having a larger size than the image produced by the lens. Since a charge coupled device CCD pixel size can be of the order of 20 microns square and an image pixel can be on the order of a millimeter for common display monitors arranged to be viewed by users from a few feet away, we can realize a gain of 50 for magnification in the electronic domain. It is theoretically possible to realize further magnification in this way, but it becomes impractical when a pixel in the displayed image is large in comparison to the resolution unit of the human eye (which depends on the viewing distance). As images are further magnified in this fashion, the pixels of the displayed image become resolvable and the discontinuity detectable. The image quality is noticeably degraded. This process is similar to enlarging a photograph from a negative; the print size can be increased without limit, however image graininess eventually becomes a problem. With advanced computer processing techniques, one may employ special algorithms to be applied to electronic images to reduce the pixelization of an electronically magnified image. Extrapolation, edge enhancement, centroiding and other techniques may be used to improve images that have been magnified this way. However, even the most sophisticated image processing cannot replace all of the information lost due to the finite resolution of the recording medium in the optical plane; in the case of most electronic imagers, the discrete picture elements of the CCD.

Another zoom-like effect for video images can be implemented purely by a computer simulation. Many images from various points-of-view are presented serially. For example, the Earth is shown as it may be viewed from outer space. The image having the oceans and land masses resolvable to the extent that one could identify the continents. The next frame of the series is magnified further. As a series of frames advances, each frame subsequent to the first can be enlarged to simulate a zoom magnification. Each image however, being created from a different point of view, a point of view closer to the scene than the previous frame, suffers no loss in resolution. The images can be generated either by an artist's implementation or real photographic type images. If photographic type images are used, then the point of view of the photographer changes between frames; i.e. the photographer gets closer to the scene each frame. As the video advances, the diameter of the Earth finally exceeds the limits of the image frame. "Magnification" continues with each frame until a particular land mass becomes easily recognizable; a body of water such as the San Francisco Bay may then become resolvable; a harbor is recognized; a specific dock is displayed; a child is shown; a red bow in the child's hair finally is occupying the entire area of the display. Of course, it is not practical for a mechanical lens in outer space to manage such an operation. The video described above is possible because the creator has prior knowledge of what images are to be displayed and those images are arranged in succession to appear to be the continuous image of a mechanical zoom system having a very large dynamic range. While good for illustrations, the video zoom is not an imaging system useful to zoom in on a scene in real time. Presently, imaging systems are limited to magnification provided by optical lenses and possibly some further manipulations of the resulting image plane.

Finally, very new vision imaging systems are capable of addressing a scene where the vision system contains some prior knowledge of the scene. By the term 'addressing a scene' it is meant that an optical axis of the system is pointed toward a scene such that a camera may acquire an optical image of the scene. An optical image of the scene can be acquired electronically and combined with a computer generated image formed based on the prior knowledge of the scene. The image displayed to a user then could be a composite image containing information from the real scene and information from a computer generated image. Appropriate combinations of these types of images can result in very sophisticated vision imaging systems. Details of vision imaging systems of this type are presented in the above-cited patent application. In brief review, by knowing the location and pointing direction of an imaging system that is addressing a scene, the scene can be identified. For example, a person on top of the World Trade Center in New York City looking south-southwest would find the Statue of Liberty in the scene; a person in Long Beach, Calif. looking south could be looking at Catalina Island; a person in Milan, Italy looking north could find Matterhorn Mountain. After identifying the scene being addressed by the vision imaging system, the computer could then supply image information particular to that scene. This information could be combined with the optically acquired images to produce composite images having incredible detail.

SUMMARY OF THE INVENTION

Comes now, an invention of vision imaging systems including devices and methods of variable magnification wherein the system addresses a scene and provides to a user an image of that scene, the image magnification being selectable by the user over an unlimited range. This is possible because composite images being comprised of optically acquired information and computer generated information can anticipate details of the scene being addressed by the vision imaging system.

The two sources of image information behave differently with respect to zoom functions but can cooperate together to produce very useful images. The image information provided by the camera responds in a fashion explained above and is restricted in its ability to be magnified. Image information generated by a computer can be provided with resolution independent of image magnification. The computer is able to generate image information which relates to the scene being addressed as long as the computer has some prior knowledge of that scene.

It is further possible that the position and attitude of the device uniquely defines the scene being addressed and some of the objects within the scene. The portion of the image which is generated by the computer does not suffer the resolution degradation as a function of magnification. This is true from an atomic scale through a galactic scale. In fact, depending on the pre-recorded information it is possible to increase or decrease the magnification without limits and to still continue to provide high resolution computer generated image information.

As in the example above of imaging a hairbow from outer space, the present invention relies on the computer having prior knowledge of the scene being addressed. However, instead of an image series arranged by an artist, the present invention responds in real time to any scene being addressed by the imaging system. In addition to simply overlaying the high resolution computer generated image onto a low resolution electronically formed image, certain image attributes, features, and characteristics as determined by the camera can be extracted from the electronic image and used to act on the computer generated images to make them more realistic. This communication between the camera's image and the computer generated image is very important to some objects of the invention.

Although systems taught previously are based on identifying a scene based on the position and attitude of the camera, the present invention includes communication between optically acquired images and computer generated images where the position and attitude of the camera is not known or measured. Certain image features display behavior with respect to zoom functions which can be manipulated to provide cooperation between computer generated and optically acquired images. These features are independent of identifying the exact scene but can be used in schemes of the invention.

It is now possible to have an electronic imager such as a camcorder or electronic binocular with magnification variable over an infinite range which is capable of presenting an image of a scene at a magnification selectable by the user of the device. Devices of the invention therefore are primarily comprised of: an imaging apparatus having a variable magnification, the magnification value being selectable over a range without limits, the apparatus comprising: a position determining means; an attitude determining means; a camera; a computer; and a display, the position determining means being operable for determining the position of the camera; the attitude determining means being operable for determining the pointing direction of the camera; the camera being operable for addressing a scene and producing an electronic image thereof; the computer being in communication with said position and attitude determining means and responsive to the determinations made therein, being operable for generating image information relating to the scene, and operable for combining the information with features of the electronic image produced by said camera to form an augmented image, and operable for presenting the augmented image at the display.

It is a primary function of this invention and a contrast to the prior art, to provide an imaging system with an unlimited magnification range. A fundamental difference between the devices and methods of the present invention and those of the art can be found when considering that the imaging system of the invention has prior knowledge of the scene being addressed and of the objects therein. It is an object of the invention to provide an imaging system. It is a further object of the invention to provide an imaging system with an unlimited magnification range. It is still further an object of the invention to provide an imaging system with unlimited magnification range where the image presented to the user contains information comprised of computer generated information and information from an electronic camera. It is further an object of the invention to provide an imaging system which has a composite image of computer generated information and information from features of an optically acquired image.

A better understanding can be had with reference to the following Detailed Description of Preferred Embodiments and with reference to the appended drawings. These embodiments represent particular ways to realize the invention and are not inclusive of all ways possible. Therefore, there may exist alternative versions of the invention that do not deviate from the spirit and scope of this disclosure as set forth by the claims, but do not appear here as specific examples.

BRIEF DESCRIPTION OF THE DRAWINGS

The features, aspects, objects and advantages of the present invention will become better understood with regard to the following description, appended claims and drawings where:

DETAILED DESCRIPTION OF THE PREFERRED EMBODIMENTS

Figure 1:
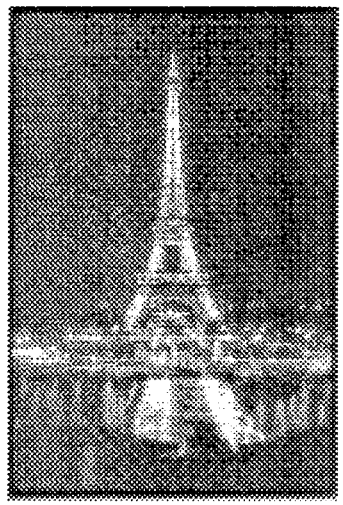
FIG. 1 is an image of a real scene, in particular, the Eiffel Tower in the city of Paris, France.

Preferred systems of the invention are primarily characterized as imaging devices and methods having unlimited magnification. An image of a scene is formed with inputs from two sources or either of the two sources. A first source is a simple electronic imaging means. A video camera or camcorder type electronic camera combines conventional optical lenses for forming images with advanced digital electronic devices like charge coupled devices CCDs which convert light into a digital signal. Electronic images produced by electronic cameras are easily stored, processed, and manipulated with computer systems. A second image source is a computer which is operable for generating imagery in response to certain stimuli. If an object or objects within a scene are recognized by the computer or otherwise "known" to the computer, the computer may respond by generating images relating to the recognized image. The computer may recall previously recorded data or images, or both, relating to the recognized object or the computer may generate imagery in response to certain features detected within an optically acquired image. These features are disclosed in detail in the parent to this application.

Of primary concern in this application is the relationship of previous teachings with particular respect to magnification. An optically acquired image cooperates with the computer generated image in a new and useful way producing surprising results. Since computer generated imagery may have far greater detail than an image produced optically, the combination may be used to present high quality images over an magnification range without limits.

We consider how the system behaves in three different magnification regions. Firstly, when the selected magnification is within the range of the optical imaging system; secondly, when the selected magnification is outside, but near, the limits of the optical system; and thirdly, when the selected magnification is far outside the limits of the optical imaging system.

If the desired magnification is within the limits of the conventional optical lens of the electronic camera, then a displayed composite image may primarily contain information generated from the electronic camera source. Where there if no contribution from the computer generated sources, the devices of the invention are reduced to simple electronic binoculars. However, in most cases the computer will provide at least minimal image contribution by adding labels or legends to optically formed images.

There is a "gray area" region where a system magnification selected by the user is outside the range of magnification available from the zoom lens but is close to the limit. In this case, some image information from the optical system is still useful in the construction of a composite image. For example, although edges become jagged or blurred because of lost resolution, color information gathered optically may yield useful hints for increasing the realism of composite images. Images generated by a computer can thus be colored properly by considering certain optical inputs. Similarly, hints about shading which are acquired optically can be used by the computer to provide realistic shadows in computer generated images.

If the desired magnification is far outside the range of the optics system, then the contribution to the composite image from the camera may be little or nothing. In fact, the optical input may be useless and a composite image may contain only image information generated by the computer.

Figure 2:
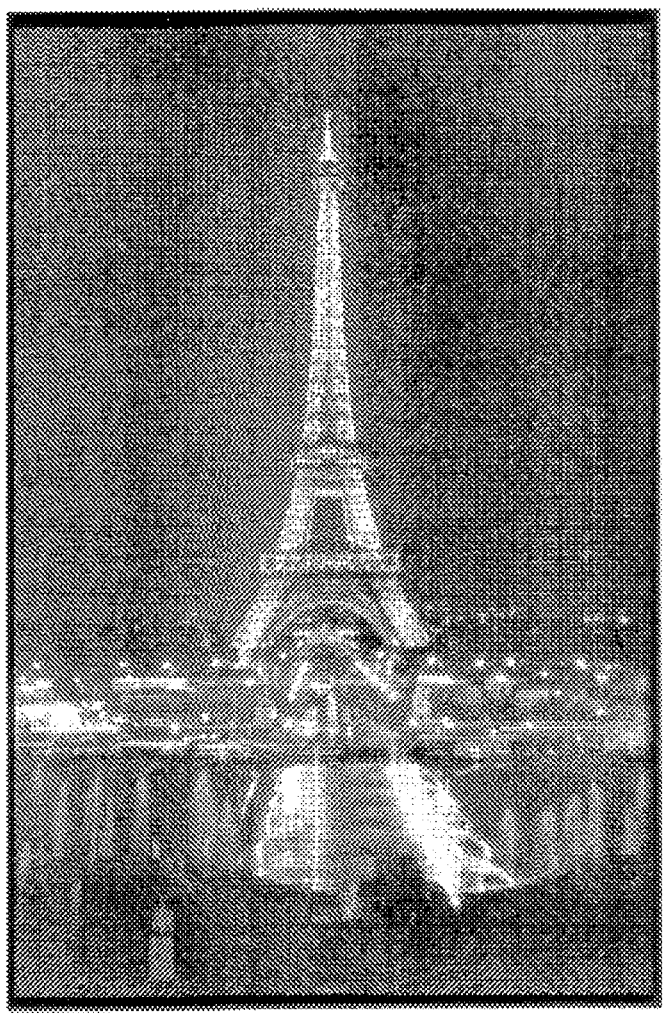
FIG. 2 is an optically magnified image of the scene of FIG. 1.

A better appreciation can be realized when considering the figures. In particular, and with reference to the figures, magnification according to the invention is illustrated for an example scene. The Eiffel Tower in Paris as viewed from a distant point may appear as the image in FIG. 1. Common optical systems allow variable magnification by adjustment of optical lenses. Therefore, these systems would allow one to manage the image shown in FIG. 2. Because of physical limits such as weight and size, practical optics have an upper end limit to their magnification. If the image of FIG. 2 is acquired electronically (as opposed to some photographic means), the image may be further manipulated in the electronic domain. However, an expert would be quick to point out that resolution problems are inherent in such techniques.

Figure 3:
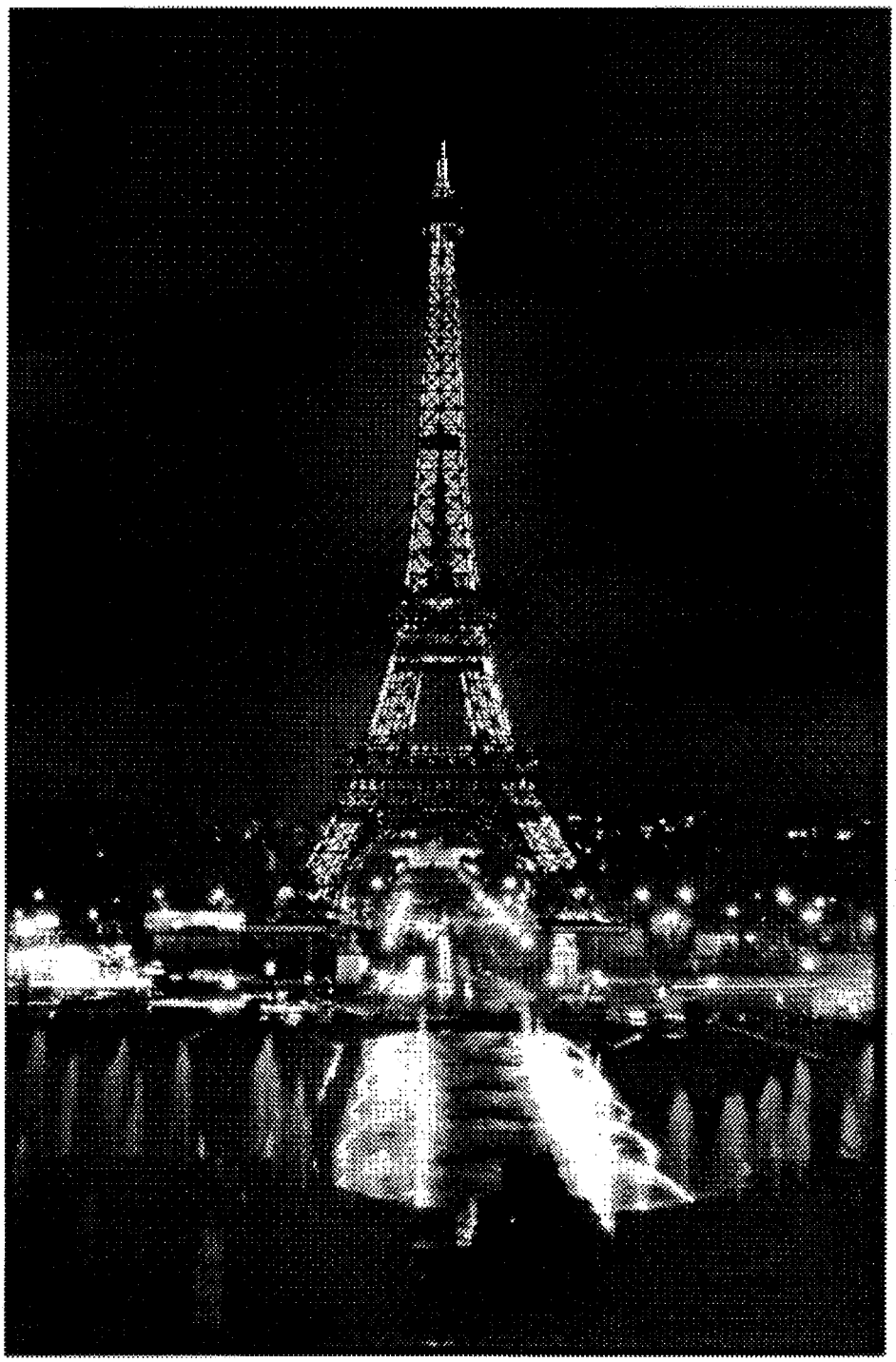
FIG. 3 is an image cmoprised of the superposition of a further magnified optical image, and a compouter generated image.

If the optical system which made the image in FIG. 2 were to accurately measure its position and attitude, it could determine that it was pointing at the Eiffel Tower in Paris. With this knowledge, it could recall from a data store a model of the Eiffel Tower which was created previously and stored in the computer. This model could then be presented simultaneously with an optically acquired image to form a composite image. Since the model could have very high resolution (limited only by the model designer), a composite image may yield resolution far beyond that which is attainable in optical systems and optical systems employing electronic magnification techniques. The image in FIG. 3 is a composite image where an optically acquired image was combined with a computer generated image. The computer, having knowledge of which scene was being addressed by the camera as determined by position and attitude of the device, recalled the model of the Eiffel Tower. Since optically acquired images and the computer generated images both exist in the electronic domain, a computer can use advanced algorithms and image processing to provide for scale and alignment functions to ensure that the composite image accurately represents the real scene.

Figure 4:
FIG. 4 is an image of the scene magnified electronically beyond the limit of the optical system such that the displayed image begins to exhibit "pixel" artifacts.

FIG. 4 shows that when increased system magnification is selected, the optically acquired image begins to display loss of resolution as object features become fuzzy. However, the edges of the computer generated portions of the composite image look very pleasing to the eye. Further magnification will result in the optically acquired image having strong pixelization artifacts.

Figure 5:
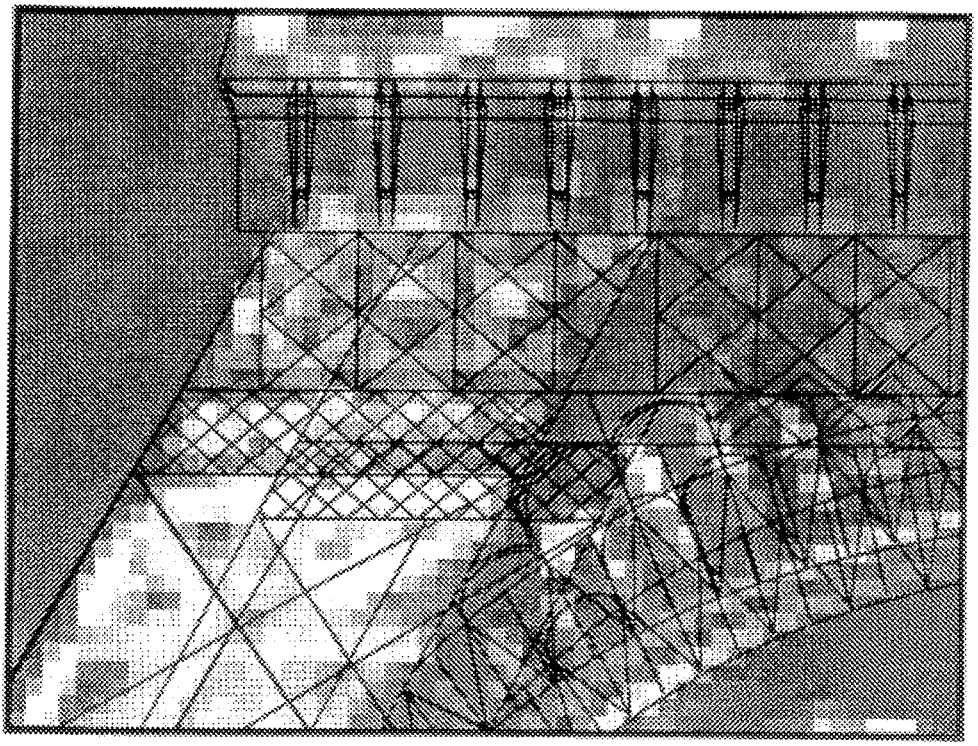
FIG. 5 is a super-magnified image comprised of information from an optically formed electronic image and information from computer generated image where the information content of the optically formed image from the electronic camera is very limited.

Indeed, the image in FIG. 5 shows a composite image where the optically acquired information is strongly degraded and contributes little to the understanding of the entire scene being addressed by the system. The computer generated portion of the composite image still looks quite good and one could easily resolve specific structural members of the tower.

Figure 6:
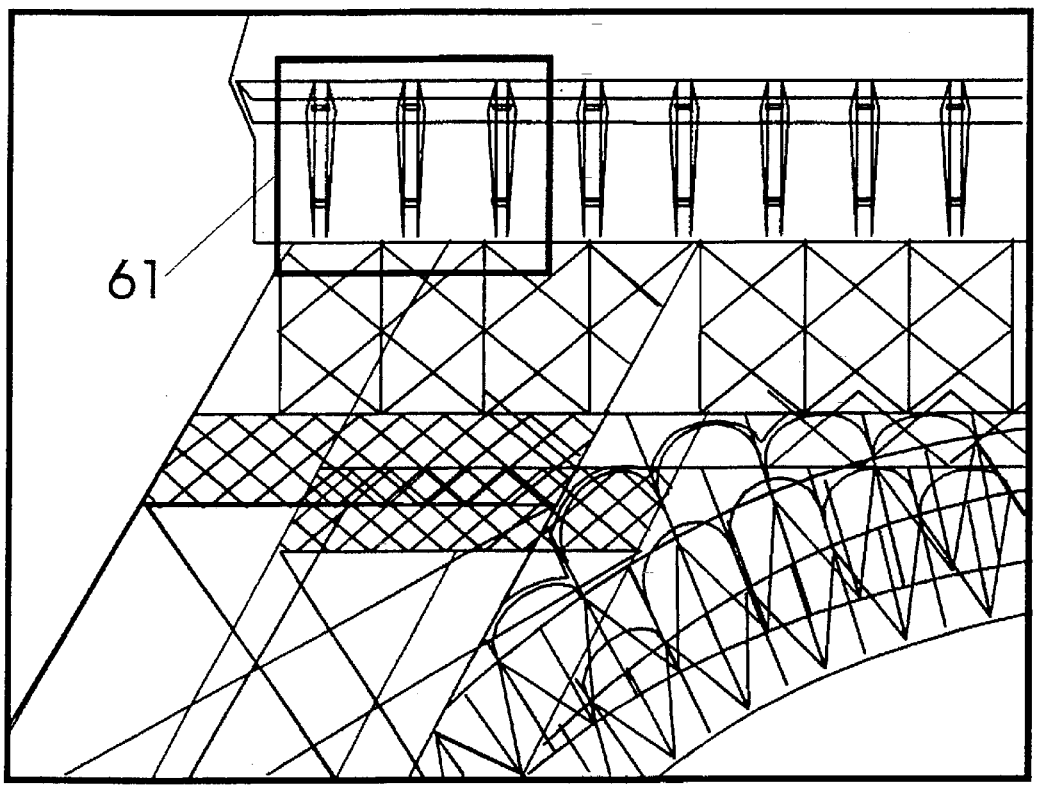
FIG. 6 is an image of a real scene where all displayed information is generated entirely by a computer.
Figure 7:
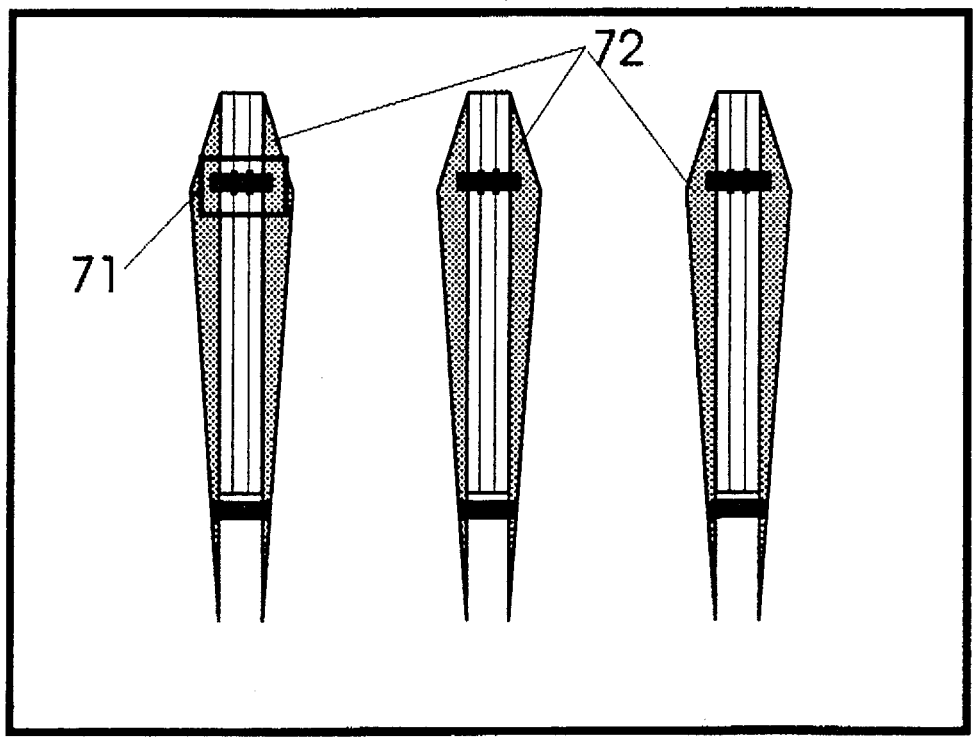
FIG. 7 is the image of FIG. 6 having been further magnified.
Figure 8:
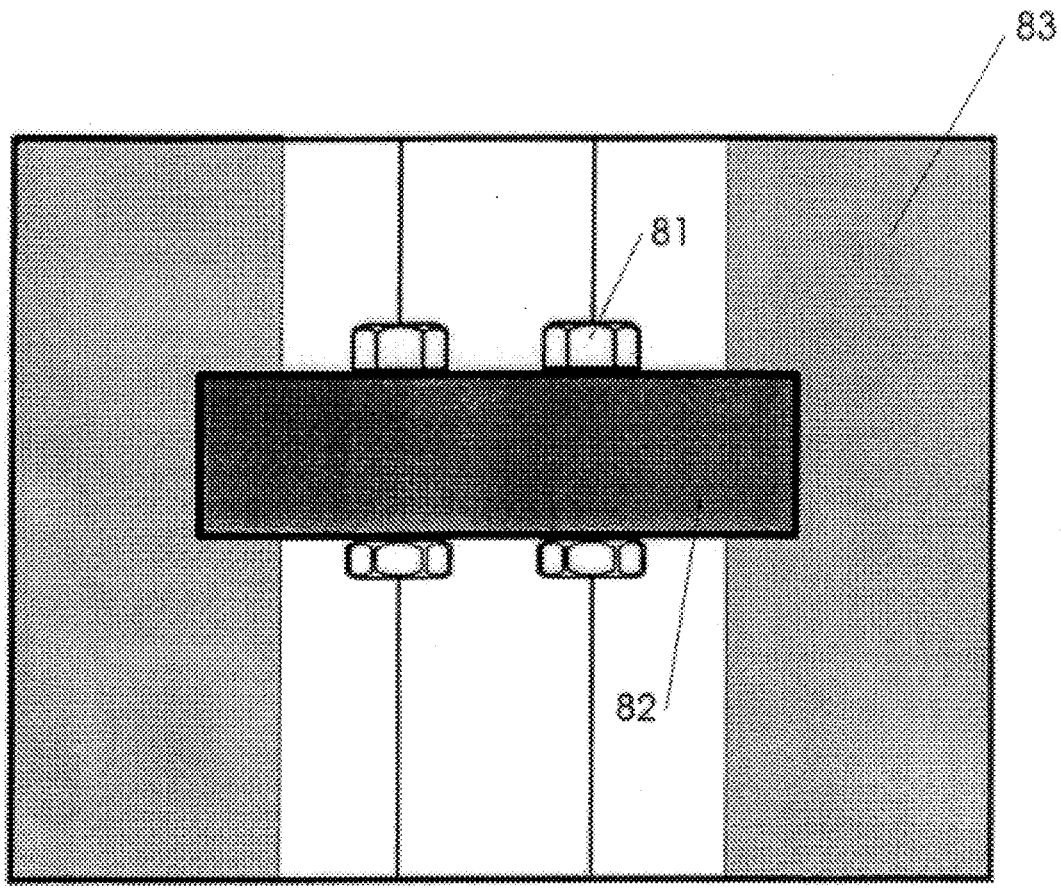
FIG. 8 is the image of FIG. 7 having been further magnified.

In FIG. 6 the magnification has not been increased but the distracting optically acquired image information has been removed. It is important for the reader to consider this image thoroughly. While it may appear at this point to be a simple computer model of the Eiffel Tower, it has far greater meaning than that. One must remember that what is displayed is dependent on the position and pointing attitude of the device addressing the scene. If the user pans right, the displayed image responds accordingly and displays other parts of the tower. If the optical input of the device is blocked at this point, the computer still knows what it is looking at and will continue to display the image in FIG. 6. For our example, we consider that the structure in the box 61 is of particular interest to the user. Therefore we now wish to magnify the image far beyond where the optically acquired image is yields any useful information. FIG. 7 shows the detailed structures 72 of box 61. The structure in box 71, being of particular interest can still be magnified. FIG. 8 shows the detail of the repetitive structure 72. As the nut 81 and the part 82 and part 83 may each be made of a different material, the zoom could conceivably continue until the molecular structure is displayed. This illustrates the true ability to magnify without limits. One could argue that there are practical limits on determining the pointing direction and that small vibrations would yield huge movement is such super magnified images. However, common anti-vibration routines and devices could easily remove such effects. If the reader now places FIG. 1 next to FIG. 8, a real appreciation of the invention can be enjoyed. A person at the location where FIG. 1 was created could not expect any known system to produce an image of the nuts and bolts shown in FIG. 8. As FIGS. 1–8 show a basic relationship between computer generated images and super-magnified images, the following descriptions and references to other figures show further ways in which optically acquired imagery may cooperate with computer generated imagery.

Figure 9:
FIG. 9 is another real scene of the famous landmark Stonehenge.
Figure 10:
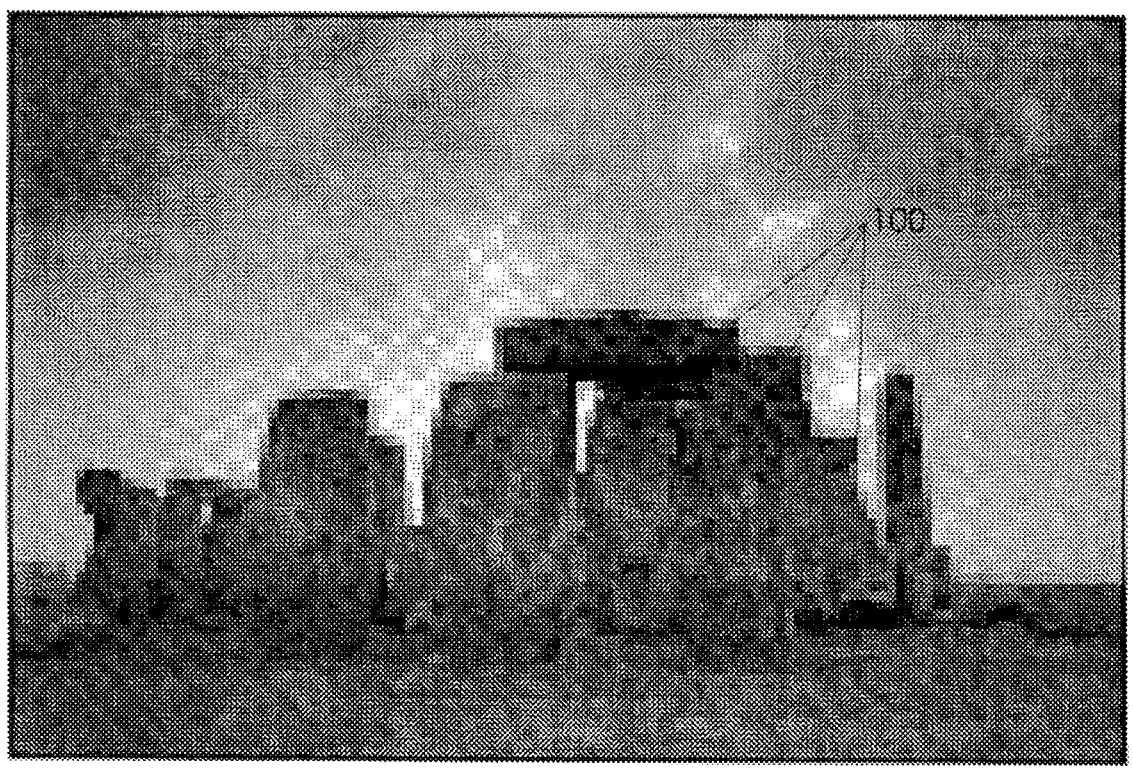
FIG. 10 shows an overmagnified optical image of Stonehenge having pixel artifacts as a result of electronic magnification between an electronic image detector and the displayed image.

FIG. 9 is an image of a well known landmark in the United Kingdom called Stonehenge. If one were very far from Stonehenge and addressing it with an electronic camera, and magnifying the image until the resolution limit of the optical image detector is exceeded, the image of FIG. 10 could be the result. Strong pixelization artifacts 100 appear first on the edges of objects. In the instant image these artifacts are little squares of a particular intensity level. The image is fuzzy and not pleasant to view. In order to obtain a better image, one would necessarily move closer to the scene.

Figure 11:
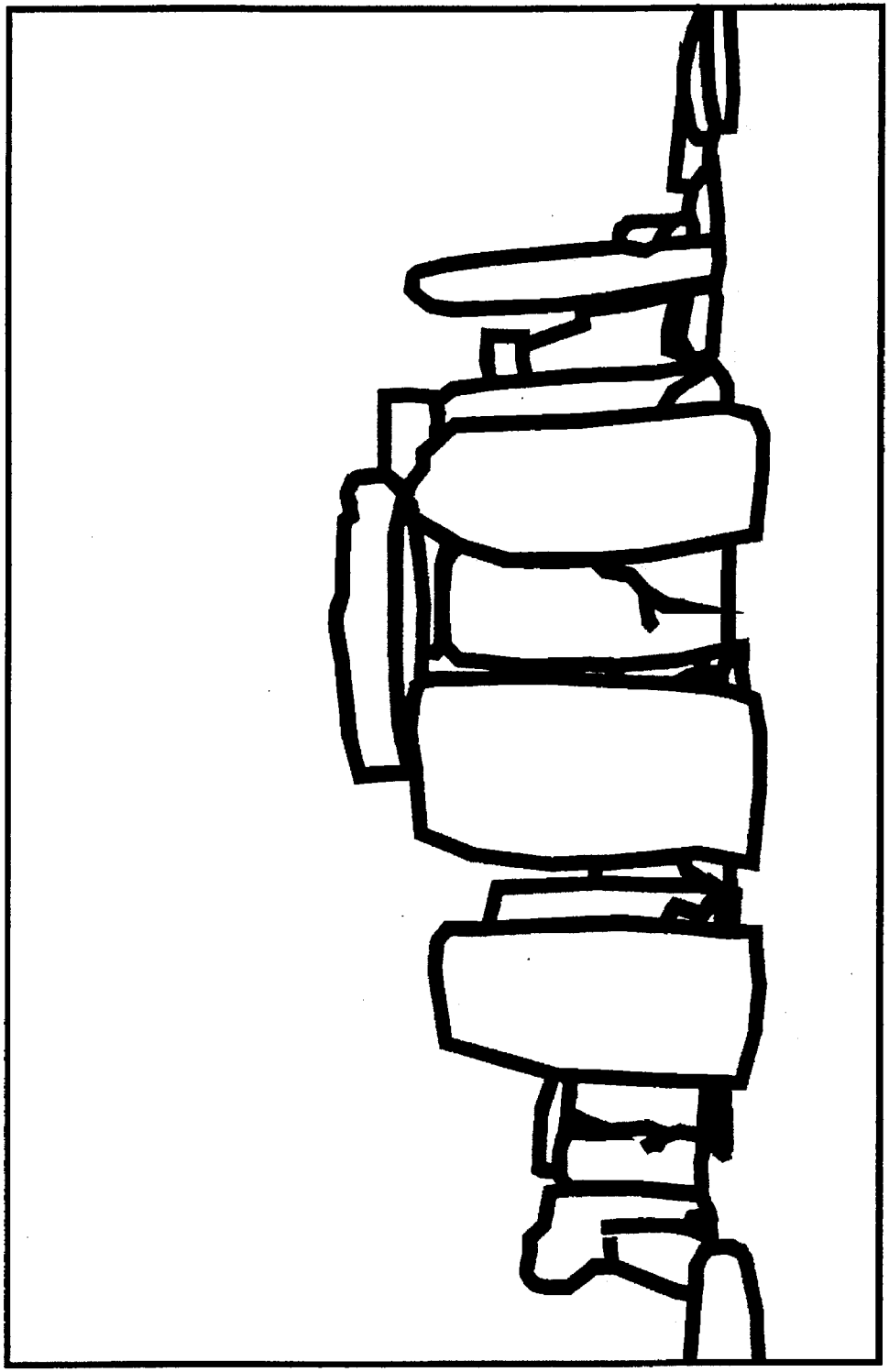
FIG. 11 is, computer generated outlines of objects in the Stonehenge scene.
Figure 12:
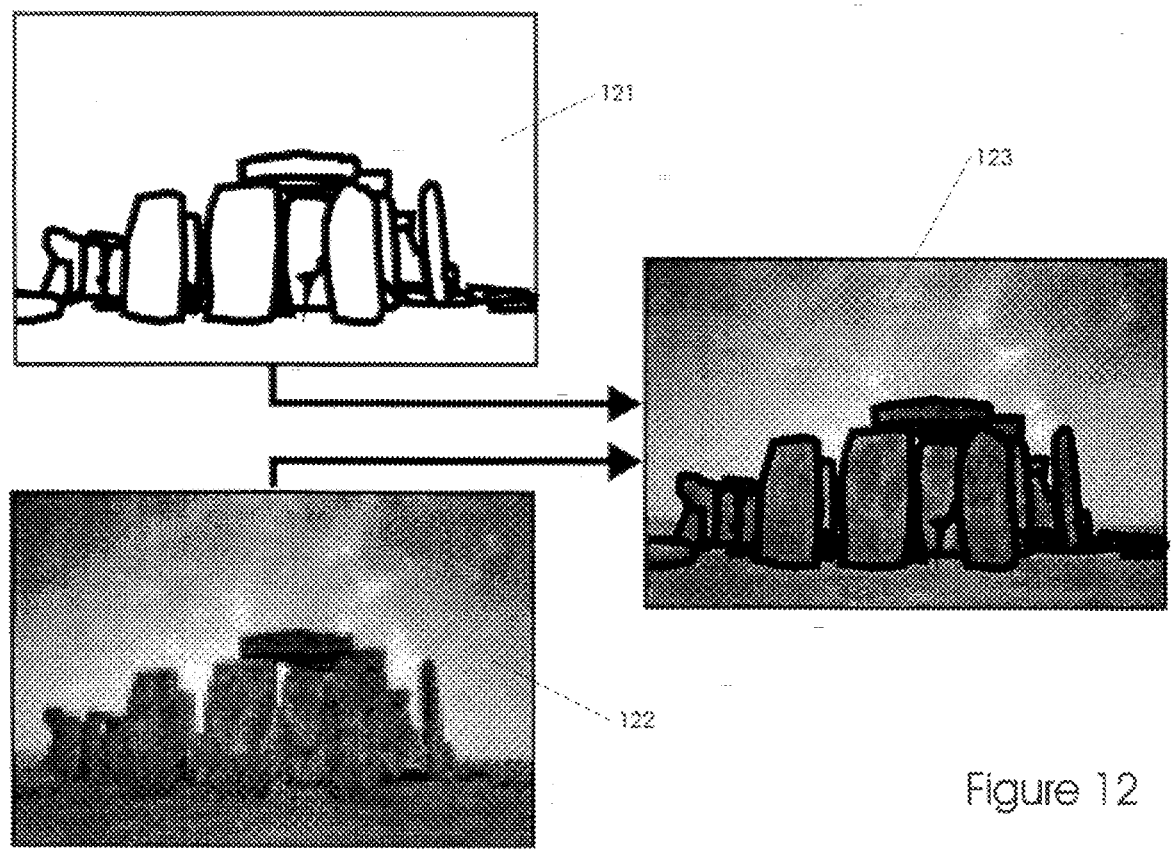
FIG. 12 illustrates a scheme where computer generated imagery is combined with an optically acquired image.

Recalling from the teachings of a previous patent application of the same inventors identified above, and from the teachings herein, it has been well established that a device after measuring position and attitude could recall a model of the scene being addressed. A very simple model could be the outline of major objects known to be within the scene being addressed. FIG. 11 shows the outline from a particular perspective of the major stones of which Stonehenge is comprised. We know that edges are problematic in over magnified optical images. Therefore, the image model show in FIG. 11 would be very useful for improving the optically acquired image of FIG. 10. FIG. 12 shows that a computer generated outline model 121 and an optically acquired image 122 form a very handsome composite image 123. By pointing the camera lens axis toward Stonehenge, the user addresses the scene. An optically acquired image 122 of Stonehenge is formed in the conventional way by the camera. The position and attitude of the device is determined and the computer easily generates an outline model 121 having the proper perspective. Sophisticated computer algorithms combine the images to yield a composite image 123.

Figure 13:
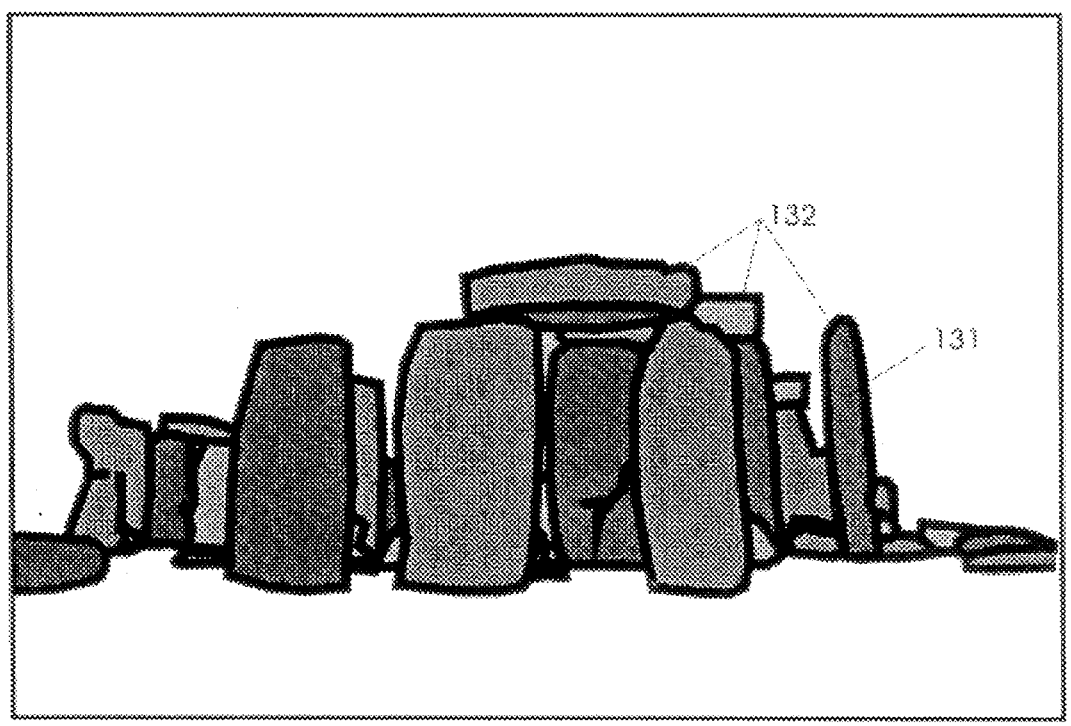
FIG. 13 shows an further detailed computer generated image having outlines and surface rendering.
Figure 14:
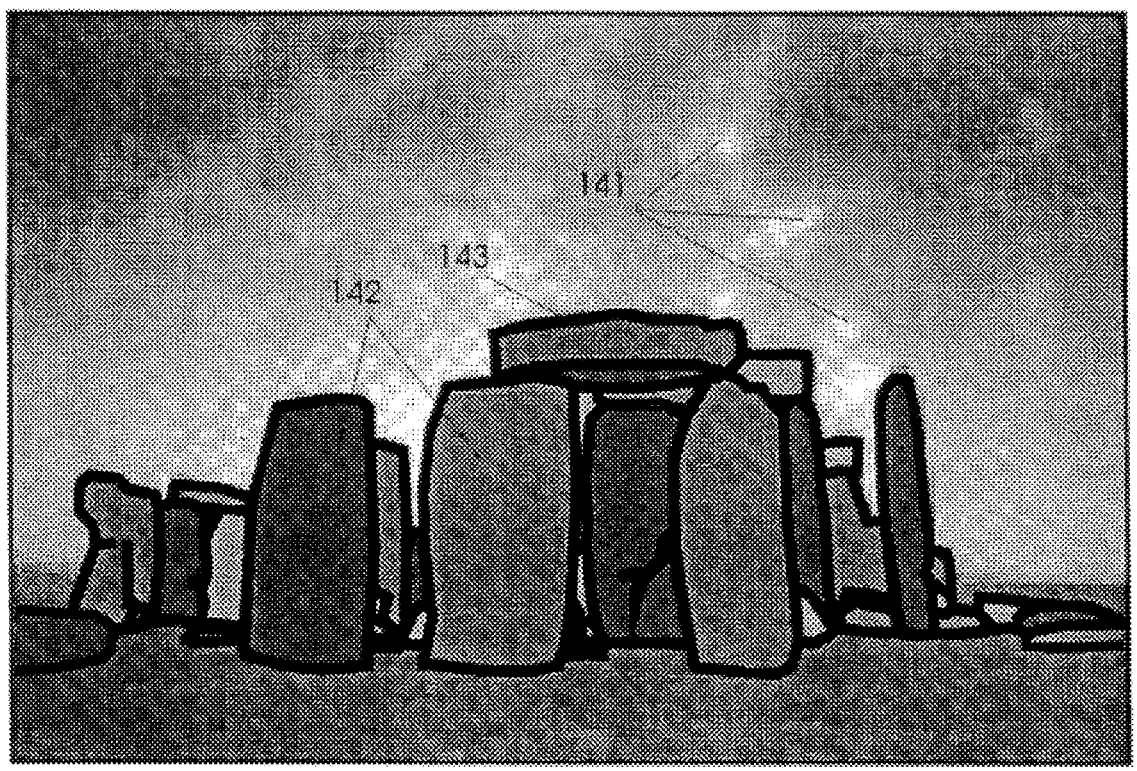
FIG. 14 shows the detailed computer generated image combined with the background of the optically acquired image.

FIG. 13 shows how a more advanced model may have outlines 132 and surface rendering 131. FIG. 14 shows the model of FIG. 13 in a composite image having outlines 143, surfaces 142 and pixelization artifacts 141 from an optically acquired image.

An expert observer will note that position and attitude determinations are useful for identifying scenes having objects which are not subject to movement. With great certainty, one can expect that the Eiffel Tower and the stones of Stonehenge will remain in their respective positions for a long time. Unfortunately, a scene is not always comprised of such objects. We hereinafter refer to objects that do not move appreciably, like the Eiffel Tower and Stonehenge, as stationary objects. Objects having a high mobility tend to be more problematic. Highly mobile objects may be airplanes, humans, cars, et cetera.

Figure 15:
FIG. 15 shows an image with a highly mobile object therein.
Figure 16:
FIG. 16 shows a computer generated representation of a mobile object.
Figure 17:
FIGS. 17 shows another highly mobile object in a real scene.

In FIG. 15 a computer generated image of Stonehenge is combined with an optically acquired background having an airplane 151 flying therethrough. Pixelization artifacts due to the over-magnified image are readily observable. Since it is conceivable that the computer could receive data from the local airport regarding the type of aircraft, the computer may be able to represent the image by a computer generate image. FIG. 16 shows that computer generated imagery may include stationary objects like stones as well as mobile objects like airplanes 161. Some highly mobile objects could not be easily tracked. For example, the rock climber 171 of FIG. 17 might not be known to the computer and any computer generated images would be void of information relating thereto.

Figure 18:
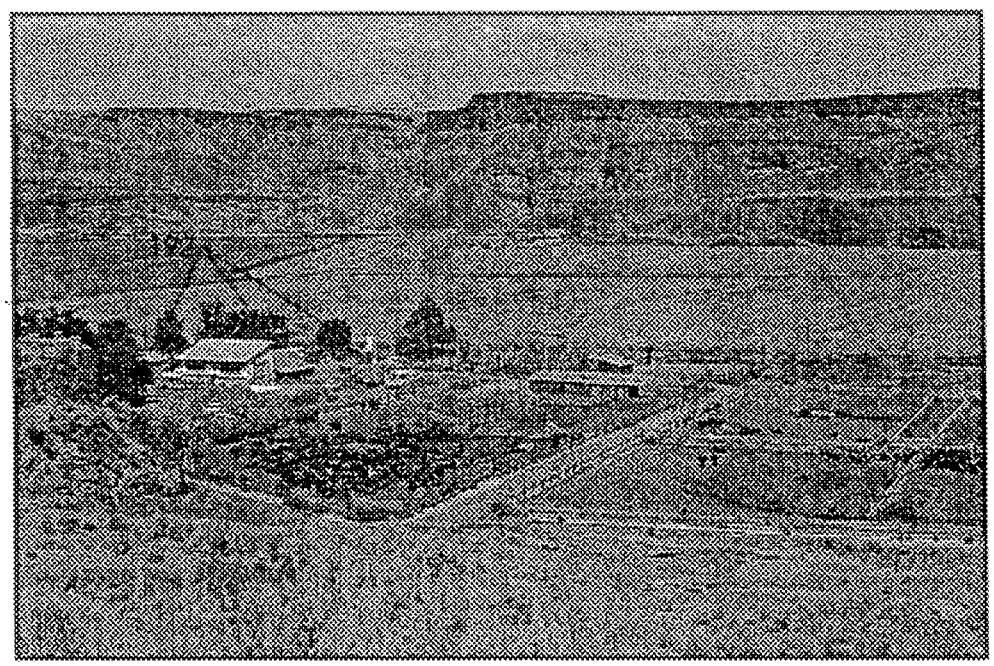
FIG. 18 shows a real scene having certain optical features.
Figure 19:
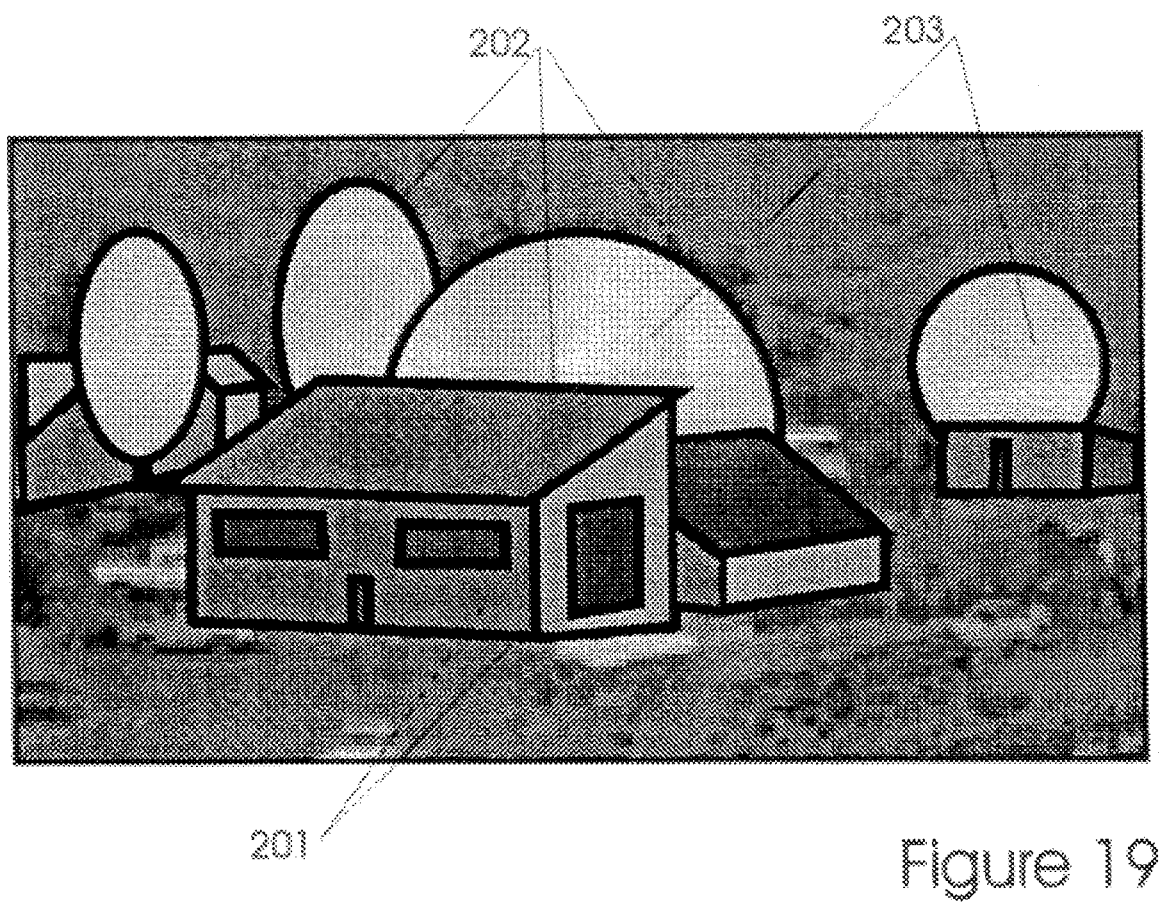
FIG. 19 shows computer generated imagery based on certain optical features of the scene in FIG. 18.

In very sophisticated versions of the invention the computer could analyze the optically acquired image to find certain hints which may aid in the preparation of the computer generated imagery. For example, although spatial image detail is lost in overmagnified images, color hints often remain useful. Consider the image of FIG. 18. If the image represents the optical limit then further magnified images must be augmented with computer generated information. The computer knowing that it is pointing at this particular barn 191 would know how to render that barn in a model. But since the computer has no way of knowing the color of the surrounding trees 192, it may be autumn causing the tree's color to change over relatively short periods of time, in addition, the shadows on the barn may cause its color to be different from time to time, the model could not account for these colors properly. Therefore, a image feature detector can be incorporated into systems to detect these colors and give the computer hints as to features of the real scene. FIG. 19 shows a super-magnified image where surfaces 201 and trees 203 carry the color of the optically acquired image as detected by image feature detectors. One can still observe the pixelization artifacts in the background of the composite image which contains: optically acquired imagery; computer generated imagery, and computer generated imagery having properties such as color detected in optically acquired images. Features such as size, the trees may have grown significantly since the model was made, may also be carried from the optically acquired image. Note that size as a feature is counter-intuitive because we stated that spatial features are lost. However only the spatial detail on the scale of a leaf on the tree is lost in over magnified optical images like the one shown. A good estimate of the size of the tree can still be made and used to act on the computer generated imagery. Similarly for shadows, measurements of the real scene can be used to operate on images generated by the computer. Although the computer could estimate the position of the sun by knowing the time of day and the season and thereby generate realistic shadows, it may be more accurate to address the real scene at a magnification within the range of the lens to gather shadow information and relay that information to the image generator of the computer to simulate real shadows in images having been magnified past the limits of the lens. In this way, dynamic conditions such as overcast skies or moving clouds could be accounted for which could not be accounted for entirely by the computer.

Another scenario where the system may be able to deduce information from a real scene and then provide magnification aided by a computer program where the magnification goes beyond the limits of the optical system can be illustrated by considering an object moving throughout the real scene. If a jet airplane is recognized when it is near and then flies away from the user until it can no longer be imaged by, but can be located by the optics, i.e. the image of the jet is smaller than one pixel, then the computer can create an image of the known jet in a "magnified" image presentable to the user. The simulated image would be displayed as long as the camera could continue to locate the real jet. Even an external radar could be used to locate aircraft. The computer could then generate an image whenever the user pointed the camera in the proper direction. The jet's identification to the computer could also be made remotely or in ways other than image recognition. By radio the jet could identify its type and the radar could locate its position. These data being relayed to a users vision apparatus, could then be used to provide a user in a particular location pointing his apparatus in the direction of the jet, an image of the aircraft, not being able to resolve the orientation of the aircraft would have to make predictions based on position differences in time. If the direction of flight is determined from a sequence radar measurements the computer could then orient the aircraft in a direction that matches the true direction of flight. This example illustrates how features of the dynamic scene can be used to control the objects of the computer generated image.

In simpler scenarios where the features of a scene are not measured in any way, but where the magnification of a real image is beyond the range possible with the lens, the optical input is still useful. Using techniques of magnification between the CCD and the display plane where pixel size is increased provides useful backgrounds which may be combined with computer generated objects. The device could display a recognized object in great detail superimposed onto the background of the scene having been magnified by "pixel expansion". Although the portions of the image formed by pixel expansion may have low resolution, computer generated objects would have very high resolution. An image formed this way could be very useful as the background information is generally less important than certain recognized objects. Background features can be mountains or large geographic features having low spatial frequency features and thereby not requiring high resolution for presentation in an image. An example of an object of particular interest may be a radio tower having high spatial frequency features. By magnifying the background of mountains with pixel expansion techniques and superimposing thereon a detailed image of the radio tower recalled from memory would allow the user to contemplate an image of the scene not possible with systems having a limited magnification.

Since the objects of a landscape scene, for example buildings and mountains, are fixed and do not move appreciably with time, it is possible to pre-record data and computer models into a data store with information regarding those objects. We expect between the time the data is recorded and the time the data is recalled and displayed that there will be little significant change to some of the objects which the scene is comprised. We rely on the features of the scene to remain the same over long periods of time. Certainly this is true for objects like mountains, buildings, bridges, statues, towers, et cetera. However there are highly mobile objects of a scene which may change from one moment to another. Birds in flight, pedestrians, cars are examples of highly mobile objects of a scene. A car parked in front of a building could not be expected to remain there for long periods. For this reason, the data store may not have information regarding the car. When a user of the system zooms in on a scene past the magnification limit of the lens, highly mobile objects may be lost from the displayed image as the composite image has a high content of computer generated objects. The system is therefore very responsive to objects of a scene having low mobility but not as responsive to objects having high mobility. Attempts to fill-in these objects may be made from recognition of objects at low magnification and replacement with computer generated objects. This may work well for objects like a Ford but not so well with a pedestrian.

Figure 20:
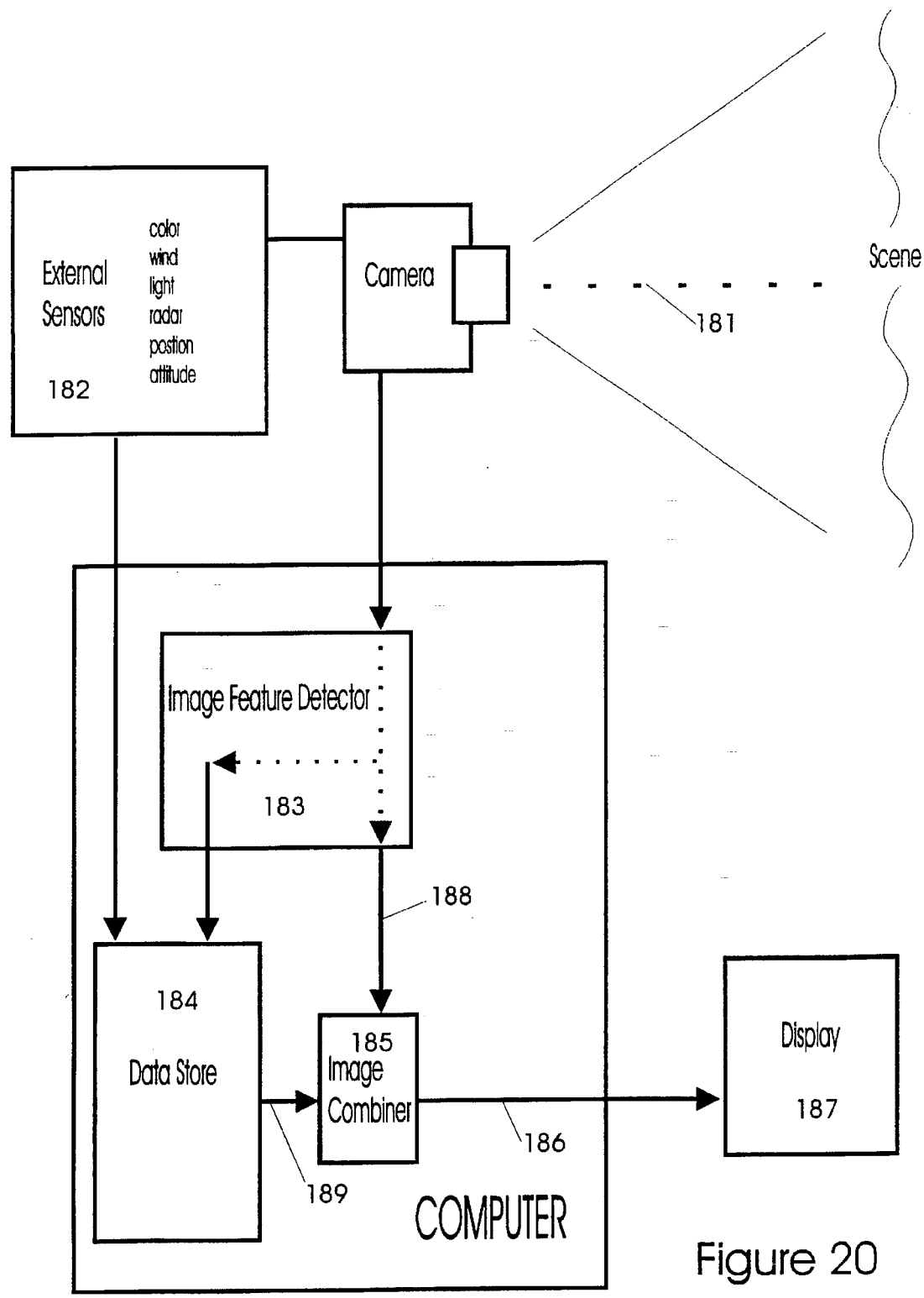
FIG. 20 is a block diagram of some major elements of the system.

FIG. 20 is a block diagram of the most important system hardware. A camera addresses a scene when the optical axis 181 of the camera and camera lens points in the direction of the scene thereby defining a pointing attitude of the camera such that the scene is contained within the field of view of the camera lens. Position and attitude determining means 182 are either co-located with the camera or incorporated into the computer such that they measure the position and attitude of the camera. In preferred versions, the camera has at its focal plane a charge coupled device for converting a photon input into an electronic signal representing an image of the scene. The signal is sent to a feature detector to identify particular features to be used to bias computer processing routines which produce the computer generated imagery. After the feature detector, the optically produced electronic image signal 188 and the computer generated image signal 189 come together at a combiner 185 which assembles the final composite image 186. That image is then passed to the display 187 where it is aligned with the scene in proper perspective (alignment not shown).

Methods of the invention include but are not limited to methods of imaging a scene at a display where the magnification is selectively variable over an infinite range comprising the steps: forming an electronic image of a scene; determining the attitude and position of a camera; recalling recorded information in accordance with the attitude and position determinations; combining the electronic image with the recalled information to form an augmented image; displaying the augmented image aligned to the scene.

Figure 21:
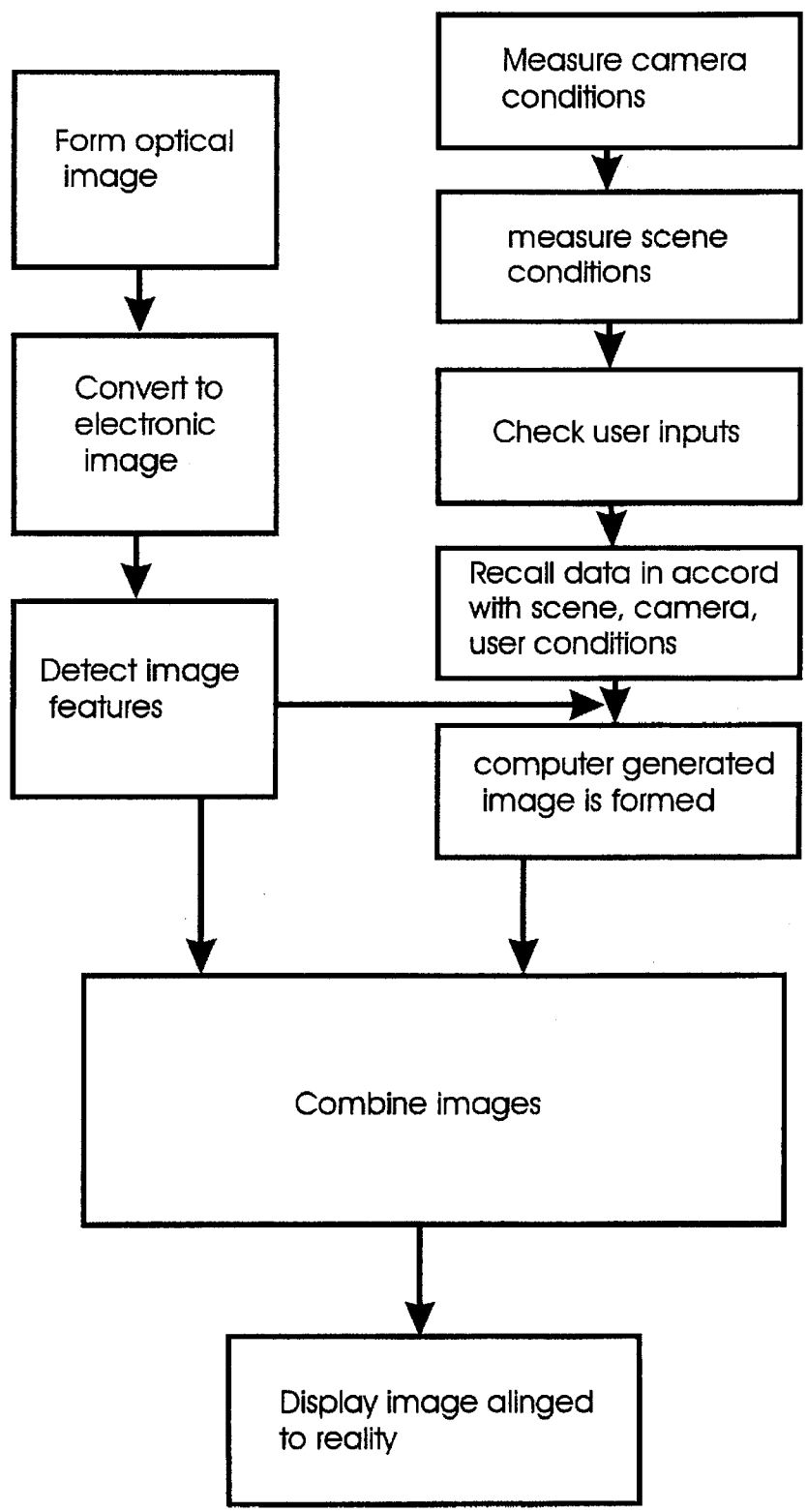
FIG. 21 is a block diagram of some major steps of methods of the invention.

As illustrated in FIG. 21, a step in which an optical image of a scene is formed 217 and converted to an electronic signal 218 occurs within the electronic camera the signal generated there is passed to a computer which can detect image features 219 such as colors etc.; simultaneously, position and attitude determinations are made 210; other scene conditions such as light direction may also be detected 211 and user inputs checked 212; data is recalled 213 in accordance with the determinations of position and attitude and a computer generated image is formed 214 based on that data and data received from image feature detection routines; the images, the computer generated image and the optically formed image are then combined 215 forming a single composite image; finally that composite image is displayed 216 to a user aligned to the real scene in proper perspective according to the users position.

It is now easily appreciated that images from an optical imaging system can be combined with computer generated images to form an "augmented reality" composite image to be displayed to the user. Since some of the features of the scene as measured at a magnification within the limits of the optical imaging system are translatable to images of higher magnification information from the two sources can cooperate to form a realistic image at any desired magnification. The system being operated at magnification values within the limits of the lens would have a final image with a high content of information from the optical imaging system. The system being operated at magnification values far outside the limits of the lens would have a final image with a high content of information from the computer generated image source. At magnification values near the limits, the final image would be comprised of similar amounts of information from both sources sharing objects and attributes of each.

In accordance with each of the preferred embodiments of the invention, there is provided an apparatus for and method of imaging a scene at any desired magnification. It will be appreciated that each of the embodiments described include both an apparatus and method and that the apparatus and method of one preferred embodiment may be different than the apparatus and method of another embodiment. Although the present invention has been described in considerable detail with reference to certain example versions thereof, other versions are possible. Therefore, the spirit and scope of the invention should not be limited to the description of the example versions above but by the following appended claims.

We claim:

1. An imaging apparatus having variable magnification selectable by a user, the apparatus comprising:
 a position determining means;
 an attitude determining means;
 a camera having a position and pointing direction associated therewith;
 a computer; and
 a display,
 said position determining means being operable for determining the position of the camera;
 said attitude determining means being operable for determining the pointing direction of the camera;
 said camera being operable for producing an electronic image of a scene;
 said computer being in communication with said position and attitude determining means and responsive to the determinations made therein, being operable for generating image information relating to the scene, and operable for combining the information with features of the electronic image produced by said camera to form an augmented image, and operable for presenting the augmented image at;
 said display.

2. An apparatus of claim 1, where the augmented image consists of from 0% to 100% information content from the electronic image of the scene as produced by the camera, and from 0% to 100% information content from computer generated image information and the sum of the information content is 1.

3. An apparatus of claim 1, where the display normal direction is aligned and parallel with the camera pointing direction.

4. An apparatus of claim 1, where the position determining means is an electronic device which measures the global position of the camera.

5. An apparatus of claim 1, where the attitude determining means is an electronic device which measures the pointing direction of the camera.

6. An apparatus of claim 1, where the computer further comprises a memory containing image models, a translation of perspective facility to operate on those image models such that the perspective of the computer generated image matches the perspective of the electronic image produced by the camera and further matches the perspective of the scene as viewed by a user of the system.

7. An apparatus of claim 1, where said computer additionally comprises an image generator which is responsive to color as represented by the electronic image.

8. An apparatus of claim 1, where said computer additionally comprises an image generator which is responsive to shading features detected in the electronic image.

9. A method of imaging a scene at a display where magnification is selectively variable comprising the steps:
 forming an electronic image of a scene;
 determining attitude and position of a camera;
 recalling recorded information in accordance with the attitude and position determinations;
 combining the electronic image with the recalled information to form an augmented image;
 displaying the augmented image aligned to the scene.

10. A method of claim 9, where the augmented image consists of from 0% to 100% information content from the electronic image of the scene as produced by the camera, and from 0% to 100% information content from recalled information and the sum of information content in the augmented image is 1.

11. A method of claim 9, where the augmented image is displayed in a plane having a normal direction aligned to and parallel with the camera attitude.

12. A method of claim 9, where the position is determined in accordance with the global position of the camera.

13. A method of claim 9, where the attitude is determined by an electronic device which measures the pointing direction of the camera.

14. A method of claim 9, where combining the electronic image with the recalled information includes operating on the recalled information with a translation of perspective routine such that the perspective of the computer generated image matches the perspective of the electronic image produced by the camera and further matches the perspective of the scene as viewed by a user of the system.

15. A method of claim 9, where said recalling recorded information which is related to color as represented by the electronic image.

16. A method of claim 9, where said recalling recorded information which is related to shading features detected in the electronic image.

* * * * *

UNITED STATES PATENT AND TRADEMARK OFFICE
CERTIFICATE OF CORRECTION

PATENT NO. : 5,625,765
DATED : April 29, 1997
INVENTOR(S) : Ellenby, et al

It is certified that error appears in the above-indentified patent and that said Letters Patent is hereby corrected as shown below:

On the title page, item [63], "116,360" should read -- 119,360 --.

Signed and Sealed this

Second Day of September, 1997

Attest:

BRUCE LEHMAN

Attesting Officer

Commissioner of Patents and Trademarks